APPARATUS FOR MEASURING THE SPEED OF AN AUTOMOBILE

Original Filed July 29, 1968 5 Sheets-Sheet 1

INVENTOR

Carl Pedersen

BY

Watson, Cole, Grindle & Watson

ATTORNEY

APPARATUS FOR MEASURING THE SPEED OF AN AUTOMOBILE

Original Filed July 29, 1968 5 Sheets-Sheet 2

INVENTOR

Carl Pedersen

BY

Watson, Cole, Grindle & Watson

ATTORNEY

APPARATUS FOR MEASURING THE SPEED OF AN AUTOMOBILE

Original Filed July 29, 1968 5 Sheets-Sheet 3

INVENTOR

Carl Pederson

BY

Watson, Cole, Grindle & Watson

ATTORNEY

APPARATUS FOR MEASURING THE SPEED OF AN AUTOMOBILE

Original Filed July 29, 1968 5 Sheets-Sheet 4

INVENTOR

Carl Pedersen

BY

Watson, Cole, Grindle & Watson

ATTORNEY

APPARATUS FOR MEASURING THE SPEED OF AN AUTOMOBILE

Original Filed July 29, 1968 5 Sheets-Sheet 5

INVENTOR

Carl Pedersen

BY

Watson, Cole, Grindle & Watson

ATTORNEY

United States Patent Office

Re. 27,739
Reissued Aug. 21, 1973

27,739

APPARATUS FOR MEASURING THE SPEED OF AN AUTOMOBILE

Carl Pedersen, Morsovej 8B, 2720 Vanlose, Denmark

Original No. 3,532,042, dated Oct. 6, 1970, Ser. No. 748,389, July 29, 1968. Application for reissue Apr. 27, 1972, Ser. No. 248,326
Int. Cl. G03b *17/24, 19/02*
U.S. Cl. 95—36 2 Claims

Matter enclosed in heavy brackets [ ] appears in the original patent but forms no part of this reissue specification; matter printed in italics indicates the additions made by reissue.

ABSTRACT OF THE DISCLOSURE

The speed of a car is measured by exposing a film twice by means of a camera, viz, when the car is in a first and a second position respectively. During the first exposure only the area of the film upon which the car and its nearest surroundings are projected is exposed and during the second exposure the remaining area of the film is exposed, viz, by projecting the car and its new surroundings upon the remaining area of the film. However, the two areas of the film overlap each other so that a photograph is obtained showing the car in two different positions driving on a lane wherein the lane appears as if it were photographed in the normal way and on which the distance between the two positions of the car can be measured. During both exposures a watch is projected upon the film in order to record the time for the exposures.

BACKGROUND OF THE INVENTION

This invention relates to an apparatus for measuring the speed of an automobile.

For measuring the speed of an automobile an apparatus comprising a camera and a watch is known. The camera comprises two lenses for simultaneously projecting the automobile upon a portion of the focal plane of the camera and the watch upon another portion of the focal plane.

The known apparatus is used in the following way:

The automobile, the speed of which is to be measured, is photographed in a first position. By this exposure the complete focal plane of the camera is exposed and by developing the film a picture is obtained showing the automobile in the position referred to together with the watch. Now, the film is advanced so that an unexposed portion of the film is positioned along the focal plane of the camera, and the automobile is now photographed in another position, and by developing this exposure a picture is obtained which shows the automobile in the other position together with the watch which shows the time of the second exposure. By comparing the two pictures it should now be possible to calculate the speed. However, the distance covered by the automobile between the two exposures can be calculated only by comparing two different pictures.

It is an object of the present invention to provide an apparatus by means of which the distance covered by the automobile between the two exposures may be determined with great accuracy in a simple way and from a single photograph.

It is a further object of the present invention to provide means for obtaining a clear and distinct photograph which conclusively proves that an automobile has been driven at a certain speed so that the photograph may be used as evidence in court.

SUMMARY OF THE INVENTION

According to the invention, an apparatus for measuring the speed of an automobile comprises a camera and a watch wherein said camera comprises lens means for focusing a distant object upon one portion of the focal plane of the camera and the watch upon another portion of the focal plane, said lens means having shutter means connected for simultaneous operation, said camera further comprising shielding means movable between a first and a second position so as to [obstruct] *admit* the light ray passage to a section of said one portion of the focal plane in said first position of said shielding means and to [obstruct] *admit* the light ray passage to another section of said one portion of the focal plane in said second position of said shielding means, said sections overlapping each other. The apparatus is used in the following way: The automobile, the speed of which is to be measured, is photographed while in a position in the part of the camera angle corresponding to the section of the focal plane to which the ray path is unobstructed when said shielding means is in said first position. A moment later the automobile is photographed once more, however with the shielding means positioned in said second position and while the automobile is in a position in the portion of the camera angle corresponding to the section of the focal plane to which the light ray path is now free. By developing and copying the piece of film which during the two exposures was positioned in the focal plane of the camera a photograph is obtained which shows a section of a street or a lane with the automobile in two different positions. From this photograph it is possible, e.g. by means of an accurate marking placed beforehand along the edge of the road, directly to measure the distance covered by the automobile between the two exposures, and the time delay between the two exposures can be determined from the two pictures of the watch which has also been photographed during the two exposures. It will be understood that the direction of the camera is not changed between the two exposures. However, should the direction of the camera be changed such movement will be clearly apparent from the photograph, seeing that the portions thereof which show the automobile in the two positions will not merge into each other.

It will be understood that unless special precautions are taken the watch will be projected in one and the same position upon the film during the two exposures or, in other words, the two exposures of the watch will be superimposed showing the hands of the watch in two different positions. In certain circumstances this may lead to ambiguity of the determination of the [line] *time* difference.

To avoid such superimposing of the pictures of the watch the apparatus may comprise ray deflecting means arranged between the watch and said other portion of the focal plane so as to project, by exposure, two mutually spaced images of the watch upon spaced areas of said other portion of the focal plane, said apparatus moreover comprising light ray stopping means so associated with said shielding means that said ray stopping means in the said first position of said shielding means stop the ray path to one of said areas and in said second position of said shielding means stop the ray path to the other of said areas. By this means it is obtained that the pictures of the watch appearing from the photograph will be separated.

DESCRIPTION OF THE PREFERRED EMBODIMENTS

Figure 1:
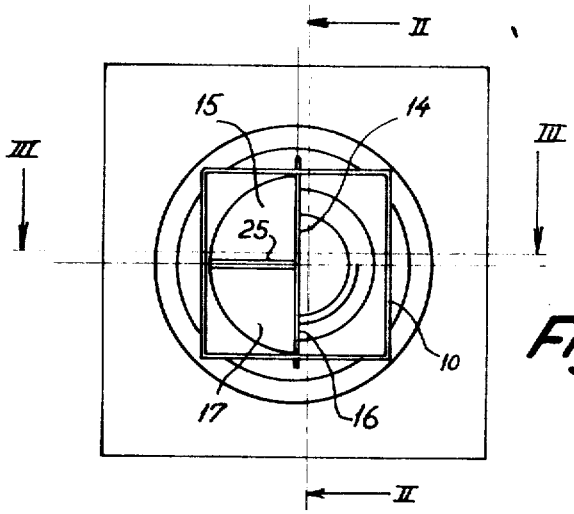
FIG. 1 shows a front elevation of an apparatus in accordance with one embodiment of the invention, however with omission of the watch which forms part of the apparatus, FIG. 2 a vertical section of the apparatus of FIG. 1 with the watch added, the section being taken along the line II—II in FIG. 1, FIG. 3 a horizontal section of the apparatus of FIGS. 1 and 2 along the line III—III in FIG. 1, FIG. 4 a horizontal section of an apparatus according to another embodiment of the invention, FIG. 5 a sectional view of the apparatus in FIG. 4 taken along the line V—V in FIG. 4, FIG. 6 a horizontal section of a further embodiment, FIG. 7 a sectional view of the apparatus in FIG. 6 taken along the line VII—VII in FIG. 6, FIG. 8 a horizontal section of a still further embodiment taken along the line VIII—VIII in FIG. 9, FIG. 9 a sectional view of the embodiment shown in FIG. 8 along the line IX—IX in FIG. 8, FIG. 10 a section of the embodiment shown in FIG. 8 along the line X—X in FIG. 9, FIG. 11 a side elevation of a further development of the apparatus shown in FIGS. 1–3, FIG. 12 a top plan view of the apparatus shown in FIG. 11, FIG. 13 a part sectional view taken along the section line XIII—XIII in FIG. 11, FIG. 14 a part sectional view taken along the line XIV—XIV in FIG. 13, FIG. 15 a sectional view taken along the line XV—XV in FIG. 14, FIG. 16 a detail of the apparatus shown in FIGS. 11 and 12, FIG. 17 a diagrammatic illustration of an apparatus according to FIGS. 11 and 12 in conjunction with associated equipment in operating position.
Figure 2:
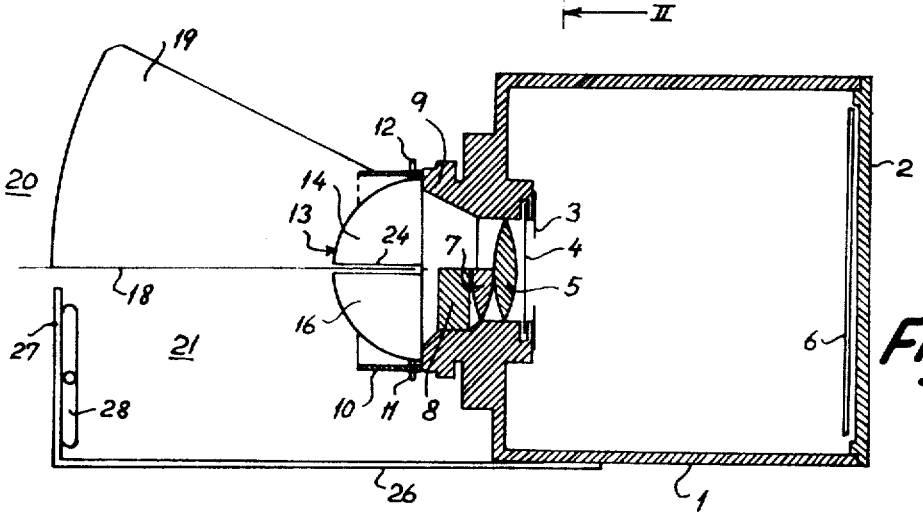
Figure 3:
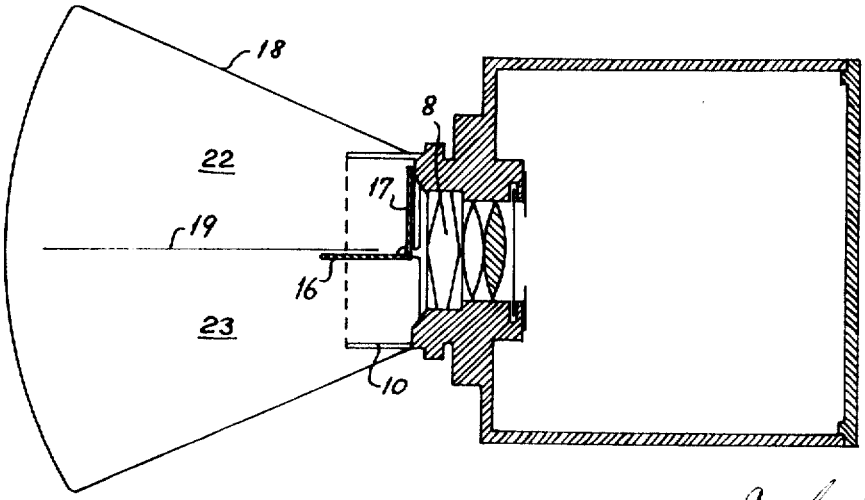

In FIGS. 1–3 of the drawing, 1 is a camera and 2 the rear wall thereof. 3 is the diaphragm of the camera, 4 the shutter and 5 the lens. The front surface of the rear wall 2 lies in the focal plane of the camera, and when loaded a film 6 is provided immediately in front of the rear wall 2.

The lens 5 is by means of the focusing device (not shown) of the camera adjusted in such a manner as to project a sharp image of a distant object upon the film 6.

A half lens 7 is positioned in front of the lower half of the lens [17] *5* and in front of the half lens 7 a double prism 8 is arranged. The light opening 9 of the camera is surrounded by a quadrangular lens hood 10. In the lens hood 10 a baffle 13 is pivotally mounted by means of two vertical trunnions 11 and 12. The baffle 13 comprises an upper semi-circular plate which is bent along the line of symmetry in such a manner that two perpendicular circle quadrants 14 and 15 are formed, and a lower semi-circular plate which is bent in the same way to form two mutually perpendicular circle quadrants 16 and 17.

To the lens hood 10 a horizontal dim plate 18 of outwardly diverging shape is secured flush with the [vertical] *horizontal* diameter of the lens 5, and to this horizontal dim plate a vertical dim plate 19 is secured flush with the vertical diameter of the lens 5. The dim plate 18 divides the vertical camera angle into an upper and a lower half 20 and 21 respectively, and the vertical dim plate 19 divides the upper portion of the horizontal camera angle into two halves, viz. a right half 22, FIG. 3, and a left half 23.

Between the upper and lower parts of the baffle 13 slots 24 and 25, FIGS. 1 and 2, are formed for receiving the dim plate 18 so that the baffle 13 may pivot from the position shown in FIGS. 1–3, wherein the quadrants 15 and 17 close the right half of the light opening 9 of the camera, through an angle of 90° to second position in which the quadrants 14 and 16 close the other half of the light opening. By said pivoting quadrants 14 is pivoted away from the vertical dim plate 19 and the quadrant 15 is pivoted towards this dim plate.

To the lower portion of the camera 1 a bracket 26 is secured as shown in FIG. 2 and a mounting plate 27 for a watch 28 is supported by the bracket in such a manner that the watch 28 is positioned in the lower half 21 of the vertical camera angle.

To measure the speed of a vehicle or automobile by means of the apparatus shown in FIGS. 1–3, the automobile is photographed by pressing the release button of the camera in order to activate the shutter 4 when the automobile is positioned in a first position within the upper left half 23 of the horizontal camera angle. By this exposure an image of the automobile and its surroundings will be projected upon the film 6, viz, upon the section thereof to which the light ray path is not obstructed by means of the baffle 13 and the dim plates 18 and 19. Simultaneously the watch 28 will be photographed, an image thereof being projected through the non-obstructed half of the prism 8, the half lens 7 and the lower half of the lens 5 upon an area of the portion of the film which corresponds to the lower half 21 of vertical camera angle. It will be understood that the focal length of the half lens 7 is so chosen that the half lens 7 in combination with the lower half of the lens 5 projects a sharp image of the watch located at a short distance only in front of the camera upon the focal plane. The baffle 13 is now pivoted 90° counter clockwise from the position illustrated in FIG. 3.

The circle quadrants 14 and 16 will now obstruct the ray path to the exposed portion of the film 6, the quadrants 14 obstructing the ray path to the exposed image of the automobile, and the quadrant 16 obstructing the ray path to the area of the film 6 upon which the watch 28 was projected.

However, this shielding of the film is not sharply defined because the dim plates 18 and 19 have a finite length so that during the first exposure the camera will also photograph the border areas between the angle halves 22 and 23 and between the angle halves 23 and 21.

When the automobile, the speed of which is to be measured, reaches the angle half 22, the shutter 4 is activated once more. Between the two exposures the camera is maintained in a fixed position and the film provided in the focal plane of the camera is now exposed once more. During the second release of the shutter 4 an image of the automobile and its new surroundings will be projected upon the section of the film 6 corresponding to the *upper* right half 22 of the horizontal camera angle, and the watch 28 will be projected through the now non-obstructed portion of the prism 8 upon an area of the portion of the film 6 corresponding to the lower *right* half 21 of the camera angle. The area upon which the watch 28 is now projected will be separated from the area upon which the watch was projected during the first exposure, because the prism 8 will deflect the ray path in relation to the ray path during the first exposure. Now, a latent image is present on the film which after developing and copying will provide a photograph showing the automobile in two different positions and two pictures of the watch. The two pictures of the watch will show the times for the two exposures, and it is now a simple matter to find the time delay between the two exposures. Moreover, the automobile will be shown in two positions on the photograph, and it is a simple matter to decide the distance between the two positions, e.g. by means of an accurate marking placed beforehand along the roadside. The two portions of the picture which show the automobile in the two positions will merge continuously into each other, because a small overlapping exists between the sections of the film upon which the two images of the automobile are projected during the two exposures. Therefore, the final photograph will reveal any movement of the camera between the two exposures and, if that is not the case, conclusive evidence of the position of the automobile at two different times has been provided.

In the embodiment illustrated in FIGS. 1–3, the upper left quadrant of the light opening of the camera is used for photographing the automobile in the first position, the upper right quadrant is used for photographing the automobile in the second position, the lower left quadrant is used for photographing the watch 28 during the first exposure, and the lower right quadrant is used for photographing the watch 28 during the second exposure.

Figure 4:
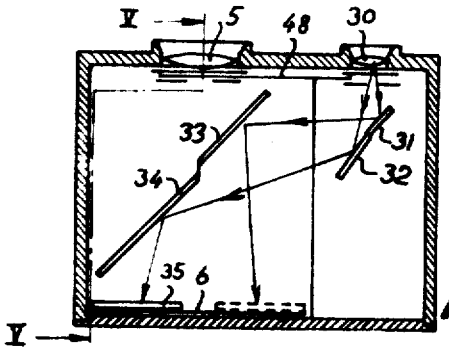
Figure 5:
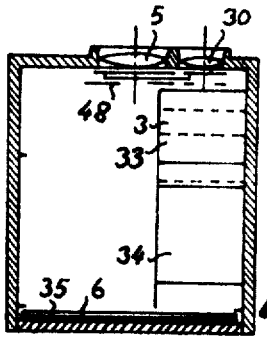

Alternatively, a camera may be used comprising two separate lenses as shown in FIGS. 4 and 5, wherein one of the lenses 5 is used for photographing the automobile, while the other lens 30 is used for photographing the watch (not shown in this figure). In order to achieve that the image of the watch is projected upon two separate areas during the two exposures, two pairs of mirrors 31, 32 and 33, 34 respectively are arranged in the ray path from the lens 30 to the film 6 in such a manner that the image of the watch is projected upon two different areas of the film 6. In this embodiment the shielding means comprises a cover plate 35 which by means known per se, and therefore not further illustrated, is movable from the position shown in FIG. 4 in full lines and to the position shown in dotted lines. In this embodiment of the invention it is not necessary to divide the camera angles, seeing that the ray path to the film 6 is directly obstructed by means of the cover plate 35. The width of the cover plate 35 is a little less than half the width of the film 6 so that a centre strip of the film will be exposed both times so that the continuity of the photograph is secured. Of course the density of the final photograph will vary due to the fact that the centre strip of the film has been exposed twice. However, this is of minor importance, seeing that a double exposure corresponds to one step only on the diaphragm scale of the camera.

Figure 6:
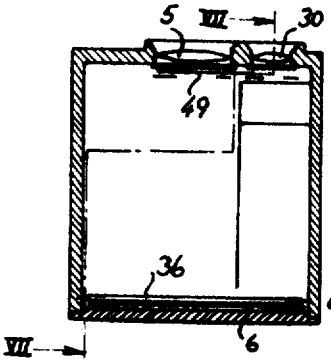
Figure 7:
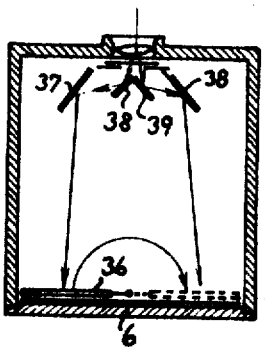

In the embodiment shown in FIGS. 6 and 7 the camera contains a flap 36 which is pivotal from the position shown in full lines in FIG. 7, where the flap covers less than one half of the film 6, to the position shown in dotted lines where the flap covers a little less than the other half of the film. In the embodiment shown in FIGS. 6 and 7 the double projecting of the watch (not shown) is obtained by means of two sets of inclined mirrors 37, 38 and 38, 39 respectively.

Figure 8:
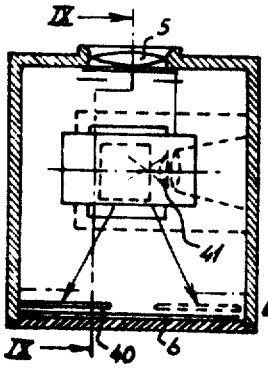
Figure 9:
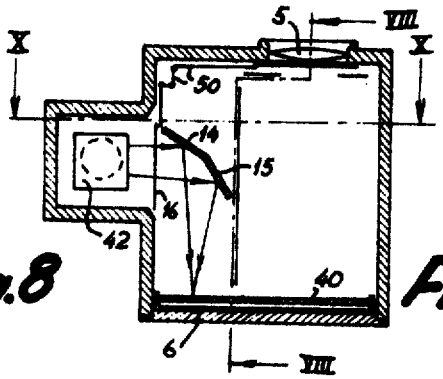
Figure 10:
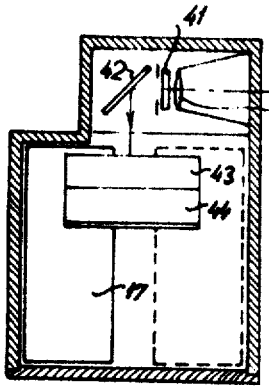

The embodiment shown in FIGS. 8–10 has a movable cover plate 40 corresponding to the cover plate 35 in FIGS. 4 and 5. In this embodiment of the invention the axis of the lens 47 for photographing the watch (not shown) extends perpendicularly to the axis of the lens 5 for photographing the automobile, and the double projecting of the image of the watch is obtained by means of a double prism 41 and three mirrors 42, 43 and 44.

In the three embodiments shown in FIGS. 4, 5 and 6, 7 and 8, 9, 10 respectively each lens has a shutter and the shutters are mutually connected by means of rod systems 48, 49 and 50 respectively in such a manner that the shutters are activated simultaneously.

FIGS. 11–16 show an automatised embodiment of the apparatus illustrated in FIGS. 1–3. The camera used in this embodiment is a 6 x 6 cm. reflex camera sold under the trademark Rolleiflex and on the camera shielding means corresponding to the lens hood 10, the pivot diaphragm 13 and the dim plates 18 and 19, as shown and explained with reference to FIGS. 1–3, are provided.

Figure 18:
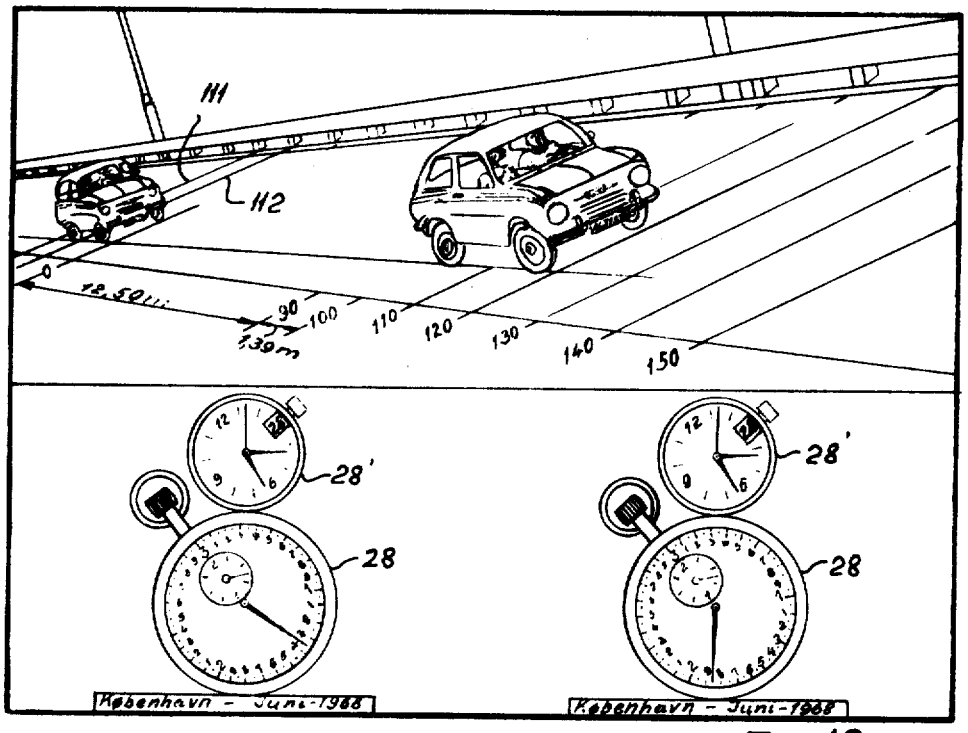
FIG. 18 is a drawing made from a photograph taken by means of the apparatus shown in FIGS. 11 and 12.

In the embodiment shown in FIGS. 11–16 two watches 28 and 28' are used, viz a watch 28 showing the seconds and the minutes, and a watch 28' showing the date, hour, minute and second. These watches are illustrated in FIG. 18.

The double projection of the watches is obtained by means of two inclined mirrors 50, 51 arranged in front of the lower half of the lens system 57, shown in FIG. 2, i.e. in front of the lowermost circle quadrants 16, 17 of the pivotable baffle 13. The image of the two watches is transferred to the mirrors 50, 51 by means of an inclined mirror 52, FIG. 11, in order to obtain a displacement of the watches 28 and 28' from the optimal axis of the lens system of the camera and to avoid inversion of the pictures of the watches.

The apparatus is driven from a motor 54, the shaft 55 of which carries a worm 56 engaging a worm wheel 57 loosely fitted on a shaft 58. The shaft 58 is by means of two nuts, FIG. 12, secured to a support 59 carried by the camera 1.

Figure 13:
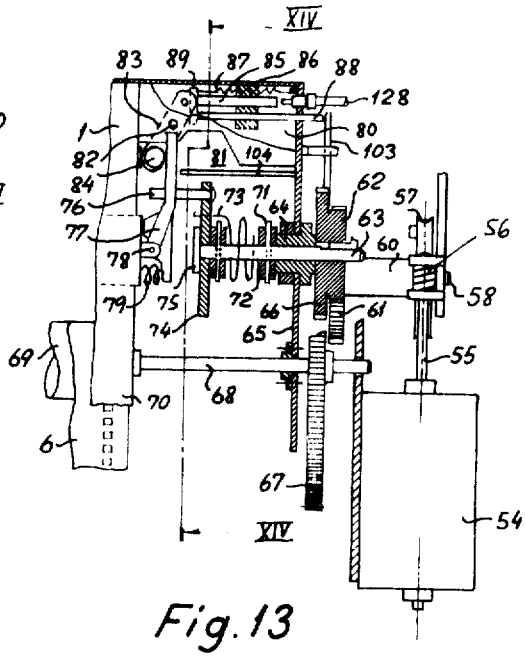
Figure 15:
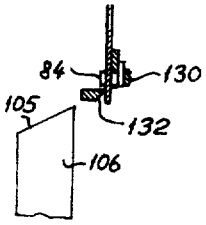
Figure 16:
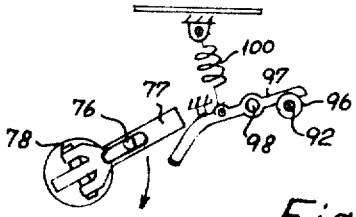

The worm gear 57 is by means of a boss 60 rigidly connected to a gear 61 which, as shown in FIG. 13, meshes with another gear 62 secured to a shaft 63. The gear ratio between the gears 61 and 62 is so chosen that the gear 62 makes two revolutions each time the gear 61 makes one revolution. The shaft 63 is journaled in a bearing liner 64 secured to a wall 65, also supported by the camera.

The gear 62 is formed with a further gear 66 meshing with a gear 67 secured to a lay shaft 68. The lay shaft 68 too is journaled in the wall 65. In the lay shaft *68* [58] a film advancing roller 69 for the film 6 is secured, and the film in a way known per se arranged in a cassette 70 mounted upon the camera 1. The gear ratio of gears 66 and 67 is chosen in such a manner that each time the gear 66 makes two revolutions corresponding to one revolution of the gear 61 the film 6 is advanced in such a manner that a new frame thereof is positioned in the focal plane of the camera.

Inside the bearing 64 a support 72 for a spring 73 is secured to the shaft 63 by means of a pin 71. The spring 73 is helically wound around the shaft 63, and one end thereof is secured to the support 72 and the other end thereof is connected to a disc 74 loosely journaled on the shaft 63. The disc 74 is prevented from moving axially on the shaft 63 by means of two stop rings 75. The disc 74 carries a dog pin 76 engaging a slot in the handle 77 of the camera.

The handle 77 of the camera, as mentioned above, is normally connected to the film advancing device and the shutter spring of the camera in such a way that the shutter spring is tensioned and the film is advanced by one full revolution of the handle. However, it is possible to adjust such cameras in such a way that the handle is disconnected from the film advancing device, and such disconnection has been made in the camera here in question.

The handle 77 is pivotable on a pin 78 of a shaft which tensions the shutter spring of the camera. The handle is biased by means of a pressure spring 79 in such a way that it tends to pivot counter clockwise about the pin 78, as seen in FIG. 13.

Between the wall 65 and the camera 1 a partition 80 is arranged having a recess 81 which allows the handle 77 to pass, if the handle is pivoted clockwise from the position shown in FIG. 13.

On the partition 80 a two-armed lever 83 is pivotally journaled by means of a pin 82. One arm of the lever carries a dog projection 84, and the other arm of said lever is pivotally connected to one end of a release rod 85 movably supported in a bearing 86. The lever 83 is biased by means of a tension spring 87. Moreover, a control rod 88 is supported by means of the bearing 86, and one end of the control rod projects through a hole in the wall 65 while the other end of the control rod rests loosely upon a traverse 89 secured *to* [by] the corresponding end of the release rod 85.

Figure 11:
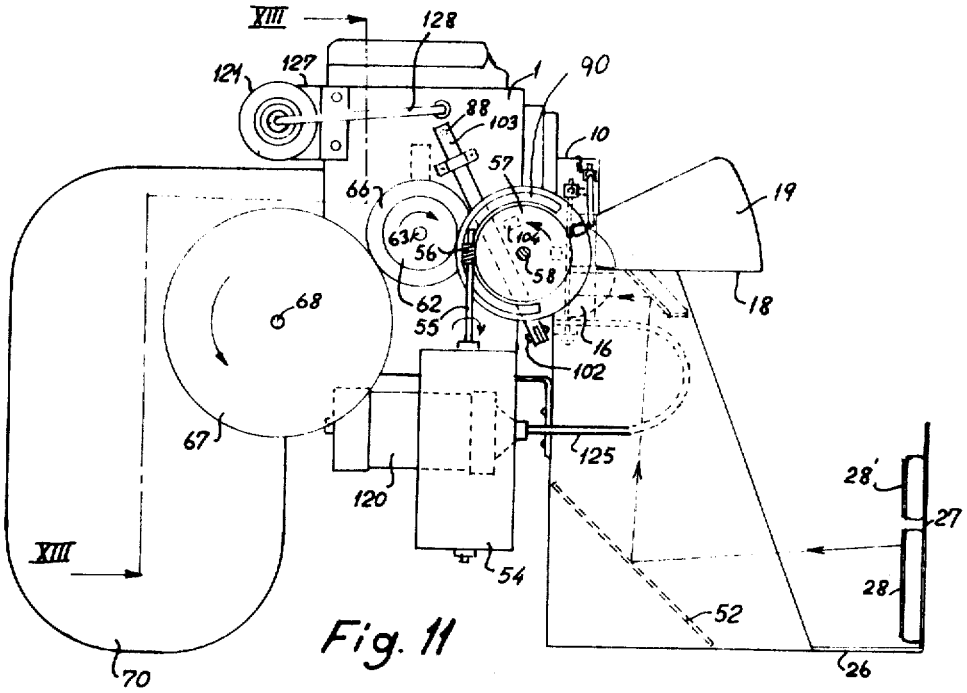
Figure 12:
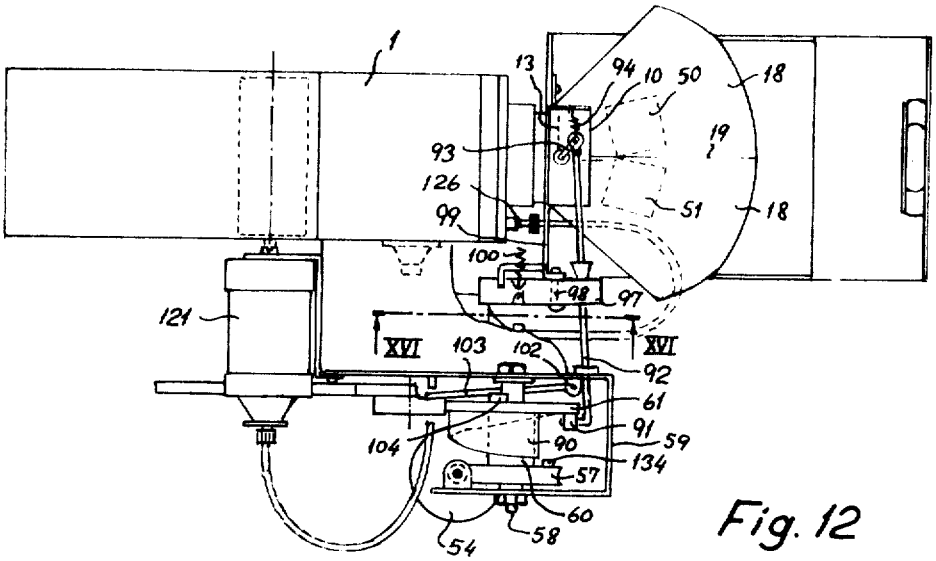
Figure 14:
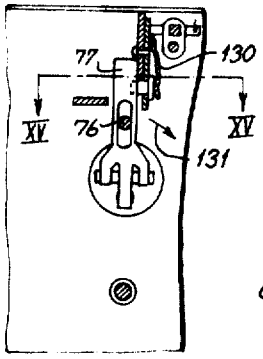

To the gear 61 a cam 90, FIGS. 11 and 12 is secured for cooperation with a roller 91 rotatably journaled on a bent end of a traction rod 92. The other end of the traction *rod* [92] is pivotally connected to a pivot arm 93 which forms an extension of the upper trunnion 12, of FIG. 2 of the baffle 13. The arm 93 is biased by means of a traction spring 94, FIG. 12, in such a manner that the arm tends to rotate counter clockwise in FIG. 12.

The *traction* [tension] rod 92 carries about midway between the ends a conical boss 96, and adjacent the boss a teasing arm 97. FIG. 12 is supported by means of a pin 98 secured to a monuting 99. The teasing arm 97 is shown more detailed in FIG. 16, from which it will be seen that it is biased by means of a spring 100 which tends to rotate the teasing arm clockwise about the pin 98.

By means of a shaft 102 secured to the camera 1 a pivotable rail 103 is supported, the upper end of which is positioned opposite the projecting end of the *control* [release] rod 88, FIG. 13. To the side of the gear 61 opposite the cam 90 a projection 104 is secured in such a position that the rail 103 is pivoted about its shaft 102 by stopping the gear 91 so that the upper end of the rail 103 depresses the release rod 88.

As explained in more detail below, the apparatus shown is brought to a condition in which it is prepared for an exposure by means of an impulse which *starts* [stops] the motor 54. The motor rotates until the worm wheel 57 has made one revolution. This revolution of the worm wheel initiates a plurality of adjusting operations.

When the gear 61 starts to rotate the projection 104 rotates the rail 103 o that the projecting end of the *control* [release] rod 88 is depressed, FIG. 13. By this movement the two-armed lever 83 is rotated so that the dog 84 rotates the handle 77 clockwise around the pin *78* [88] until the handle is positioned opposite the recess 81 in the partition 80. The handle 77 can now be rotated in order to tension the shutter spring, and this movement is transferred to the handle 77 via the gear 61, the gear 62, the shaft 63, the spring 73, the disc 74, and the dog rod 76. The rotation is transferred by means of the spring 73, seeing that, as previously explained, the disc 74 is loosely journaled on the shaft 63. As soon as the worm wheel 57 has made one half revolution, the shaft 63 has made one full revolution and the handle 77 will now occupy the position shown in FIG. 13 and abut against the partition 80, seeing that in the meantime the two-armed lever 83 has been returned to the starting position by means of the spring 87. Moreover, the wall 65 supports a guiding rail 106 shown per se in FIG. 15. This guiding rail has an inclined end 105 and will during the last part of the revolution of the handle 77 guide the handle into the position shown in FIG. 13, so that the guiding rail will support the action of the spring 79. During the next half revolution of the worm wheel 57 the shaft 63 will be rotated a further revolution, but at the same time the disc 74 will be maintained in its position owing to the engagement of the dog rod 76 in the slot of the handle 77 and the abutment of the handle against the partition 80. The result will be that energy will be accumulated in the spring 73.

During the said revolution of the worm wheel 57 the roller *91* [71] of the *traction* [tension] rod 92 will be moved downwards in FIG. 12 due to the engagement with the cam 90. By this movement the arm 93 will be pivoted 90° clockwise in FIG. 12 against the action of the spring 94, and the conical boss 96 will be drawn under one end of the teasing arm 97 until this arm owing to the tension of the spring 100 snaps down behind the broad end of the boss 96. The baffle 13 has now been pivoted 90° and occupies the position shown in FIGS. 1–3.

Moreover, one revolution of the worm gear 57 advances the film in the camera so that a new frame of the film is positioned in the focal plane, thereof as previously explained. The advancing is carried out by means of the gears 66, 67.

Figure 17:
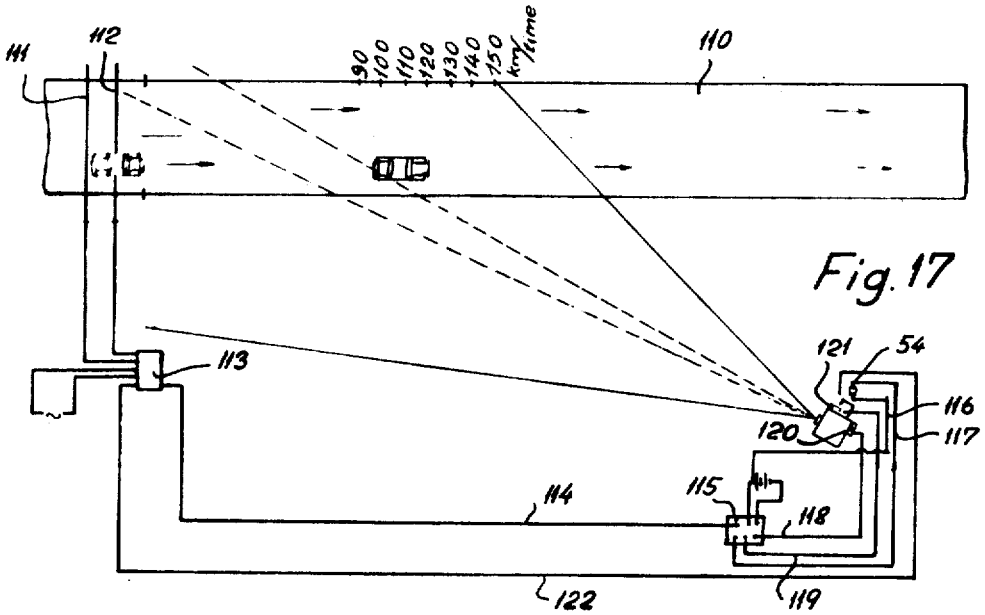

The apparatus is now ready for the first exposure and this exposure is initiated by means of a control equipment known per se and shown in diagram in FIG. 17. Across a lane 110 of a road two feelers 111 and 112 are arranged. The feelers are connected to a relay box 113 which by means of an impulse wire 114 is connected to a further control box 115 to which the motor 54 is connected by means of two wires 116 and 117. To the relay box 115, two further double wires 118 and 119 are connected, each of which is connected to a magnetic releaser 120 and 121 repectively. From the motor 54 a return wire 122 extends to the relay box 113.

The control equipment shown is of a kind known per se and does not require a detailed explanation. However, it should be mentioned that an impulse is transmitted to the magnetic releaser 120 when an automobile passes the feelers 111 and 112 with a speed which increases a predetermined speed to which the equipment is adjusted.

The magnetic releaser 120 is secured to the lower side of the camera 1 and is by means of a release cable 125 connected to the release button of the camera as shown at 126. FIG. 12.

Also the magnetic releaser 121 is secured to the camera, viz. by means of a mounting 127 and is by means of a release *cable* [table] 128 connected to the wall 65, FIG. 13, opposite the end of the release rod 85.

When an automobile passes the two feelers 111 and 112 with a speed exceeding the speed to which the equipment is adjusted an impulse is transmitted to the magnetic releaser 120 so that the shutter is released and a first exposure is carried out, as previously explained. The feelers are arranged in the left part 23 of the horizontal camera angle of FIG. 3.

Immediately after this exposure the magnetic releaser 121 is operated by an impulse from the relay box 115. Thereby the release rod 85 is depressed and the lever 83 is rotated so that the dog 84 pivots the handle 77 into the recess 81 in the partition 80. The energy accumulated in the spring 73 is now used to revolve the handle 77 one revolution so that the shutter spring of the camera is tensioned once more. During this revolution of the handle 77 it strikes the teasing arm 97 arranged in the path of the handle, cf. FIG. 16, so that the boss 96 on the traction rod is released. The baffle 13 is now pivoted to the starting position, shown in FIG. 12, by means of the spring 94. The shutter spring of the camera is now under tension, and the baffle 13 has been adjusted whereafter the magnetic releaser 120 reacts once more. The impulse to the second operation of the magnetic releaser 120 is also transmitted from the control box 115 and the time delay between the two releasers has in advance been adjusted in such a manner that the automobile which initiated the cycle of operation has now reached the right half 22 of the vertical camera angle, as previously explained with reference to FIG. 3. The frame of the film positioned in the focal plane of the camera is therefore exposed twice, and by the development and copying of the film a photograph is obtained, as shown in FIG. 18 of the drawings. The photograph shows the automobile in two positions and two pictures of the watches as a result of the two exposures. The average speed of the automobile can now be derived very easily.

In view of the fact that the time delay between the two exposures is very short, the handle 77 must be revolved very rapidly, but this is indeed possible by means of the energy stored in the spring 73. However, it may happen that the two-armed lever 93 has not yet returned to its position shown in FIG. 13 when the handle has finished its revolution driven by the spring 73. In order to avoid such functional disturbance, the dog pin 84 is movably arranged in the corresponding end of the two armed lever 83 in such a manner that the dog may be detached against the action of a spring 130, FIG. 14. Moreover, the leading side of the handle 77 is inclined as shown at 132 in FIG. 15. By means of this construction [it is obtained that even] if the two-armed lever 83 has not reached the position shown in FIG. 13 at the arrival of the handle 77, the spring 87 will nevertheless be able to move the lever 83 to the position shown, seeing that the dog pin 84 will be depressed in to the lever against the action of the spring 130 by co-operation with the inclined side 132.

Immediately after the magnetic releaser 121 has released the second exposure an impulse is transmitted to the motor 54 which starts rotating the worm wheel 57 in order to carry out the operations previously referred to. As soon as the worm wheel 57 has made the revolution necessary to prepare the camera for the first exposure a projection 134, secured to the gear wheel 57, opens a switch (not shown) having two contact sets one of which disconnects the motor from its power source. Therefore, the motor stops. The other contact set is closed momentarily and then opened again, but 122 is a double wire the two ends of which are connected to the second contact set and thereby restores the relay box 113 to zero posiiton, so that the feelers 111 and 112 are ready to detect the next automobile passing the feelers 111 and 112 at a speed exceeding the speed for which the plant is adjusted. Now, the sequence of operations previously explained is carried out starting with the first exposure released by means of the magnetic releaser 120.

I claim:

1. Apparatus for measuring the speed of an automobile, comprising a camera and a watch wherein said camera comprises lens means for focusing a distant object upon one portion of the focal plane of the camera and the watch upon another portion of the focal plane, said lens means having shutter means connected for simultaneous operation, said camera further comprising shielding means movable between a first and a second position so as to [obstruct] *admit* the light ray passage to one section of said one portion of the focal plane in said first position of said shielding means and to [obstruct] *admit* the light ray passage to another section of said one portion of the focal plane in said second position of said shielding means, said sections overlapping each other.

2. Apparatus according to claim 1, wherein ray deflecting means are provided between the watch and said other portion of the focal plane, so as to project by exposure two mutually spaced images of the watch upon spaced ares of said other portion of the focal plane, said apparatus moreover comprising a light ray stopping means so associated with said shielding means that said ray stopping means in said first position of said shielding means stop the ray path to one of said areas and in said second position of said shielding means stop the ray path to the other of said areas.

References Cited

The following references, cited by the Examiner, are of record in the patented file of this patent or the original patent.

UNITED STATES PATENTS

| | | | |
|---|---|---|---|
| 1,971,435 | 8/1934 | Wear | 95—36 |
| 1,991,924 | 2/1935 | Dolan | 95—36 |
| 2,056,600 | 10/1936 | Crosier | 95—1.1 |
| 3,122,077 | 2/1964 | Splendore | 95—36 |
| 3,135,184 | 6/1964 | Siebenberg | 95—36 |

ROBERT P. GREINER, Primary Examiner

U.S. Cl. X.R.

95—1.1